G. W. BEADLE.
TUBE CUTTING MACHINE.
APPLICATION FILED NOV. 22, 1909.

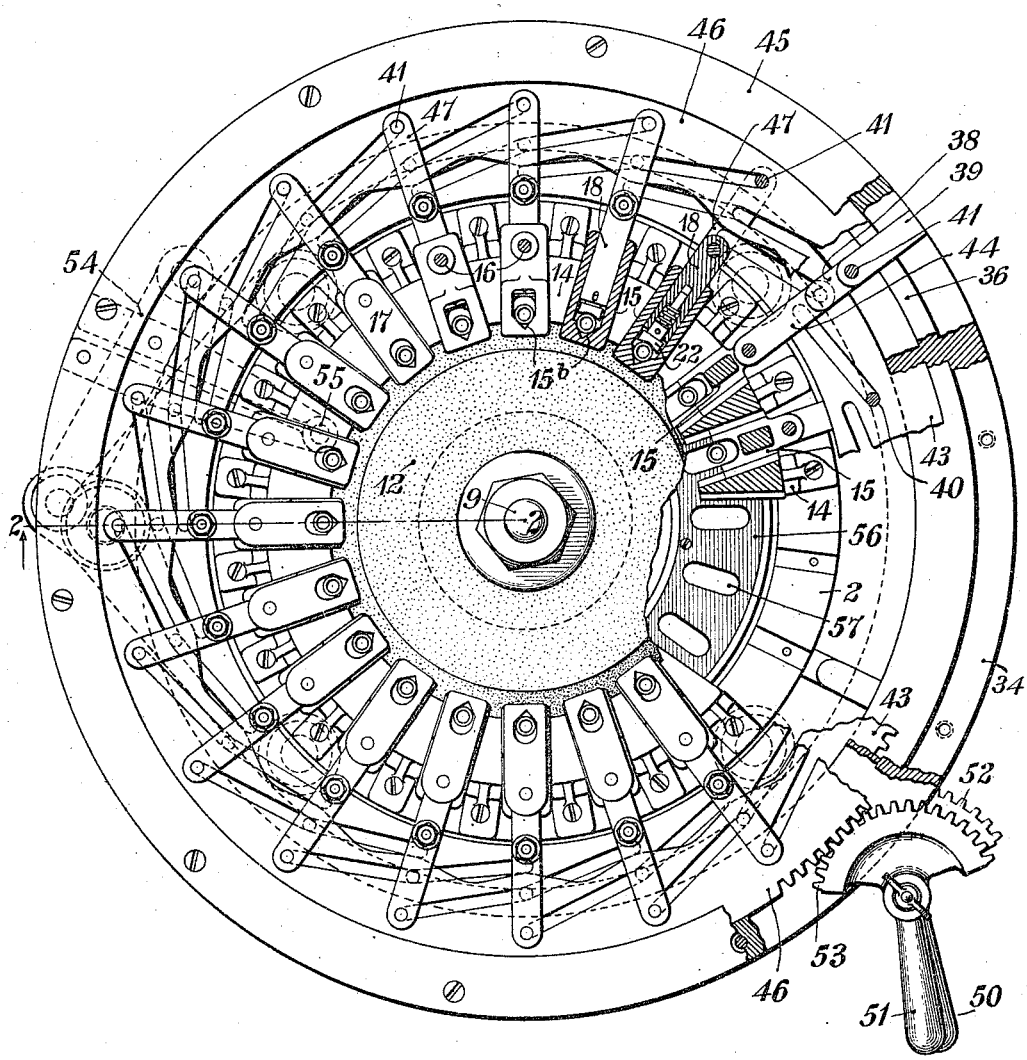

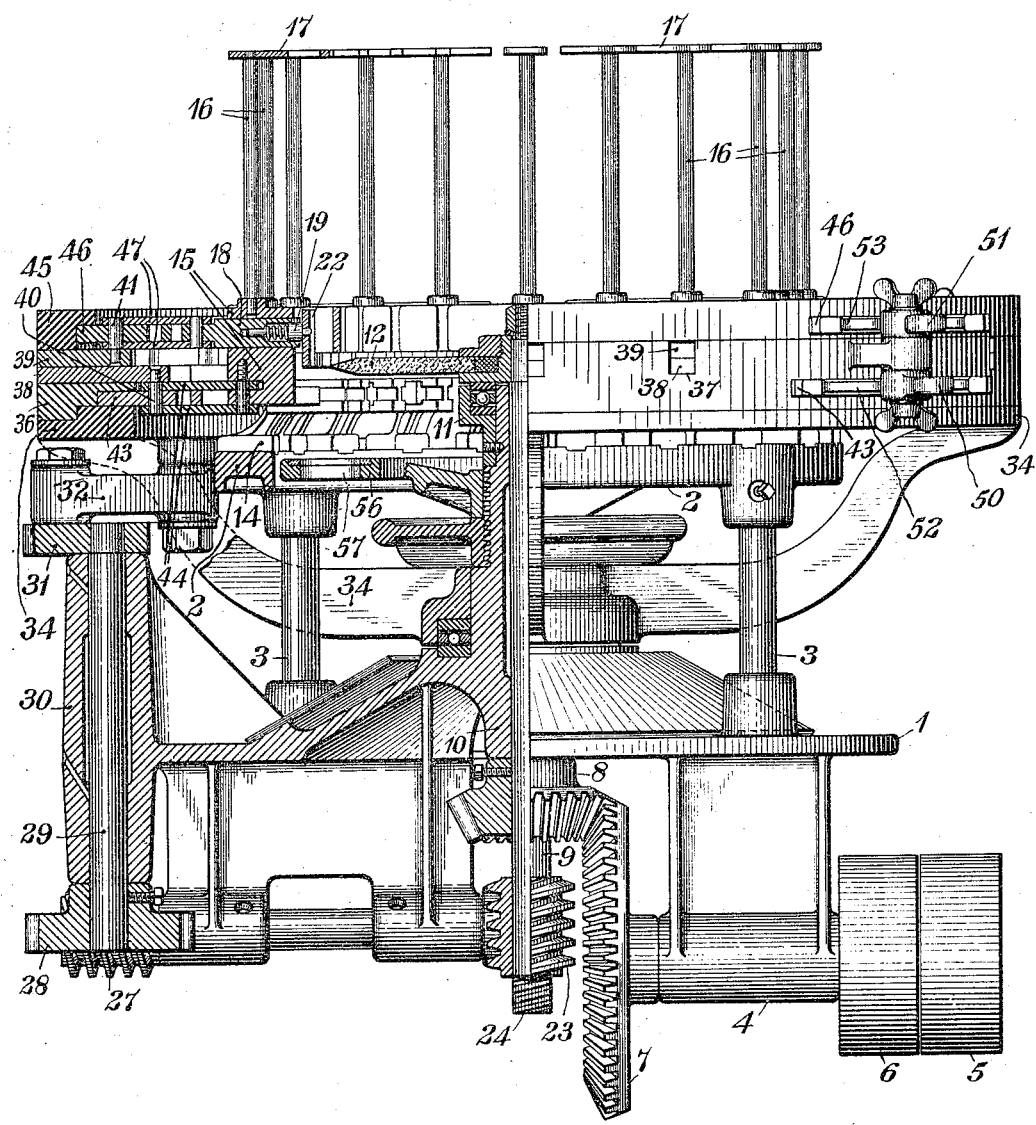

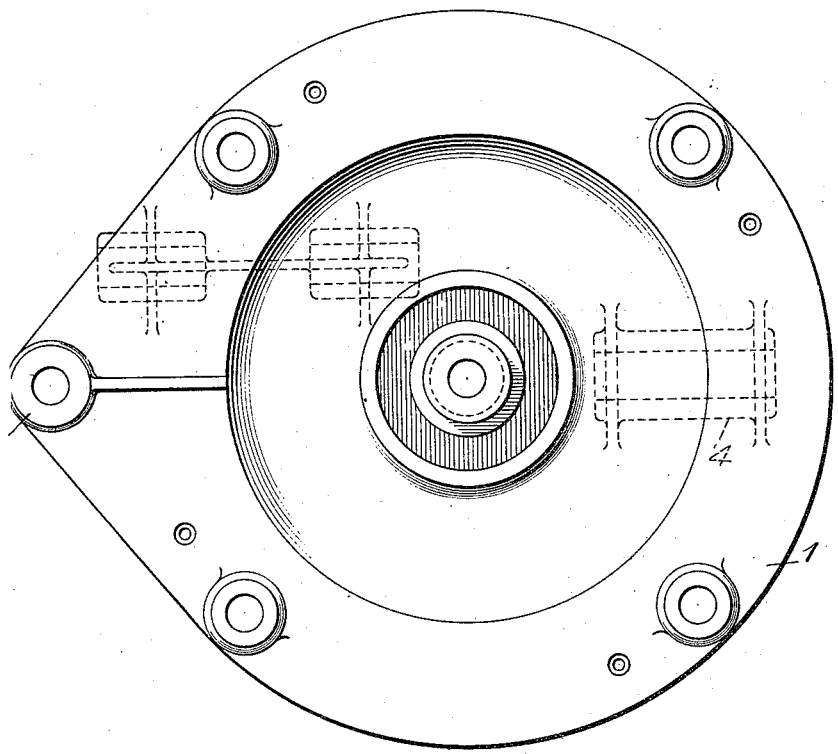
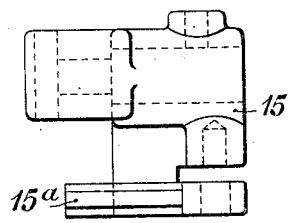
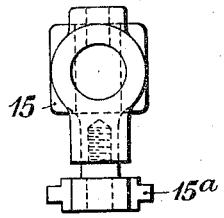
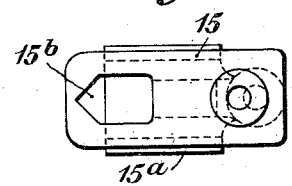

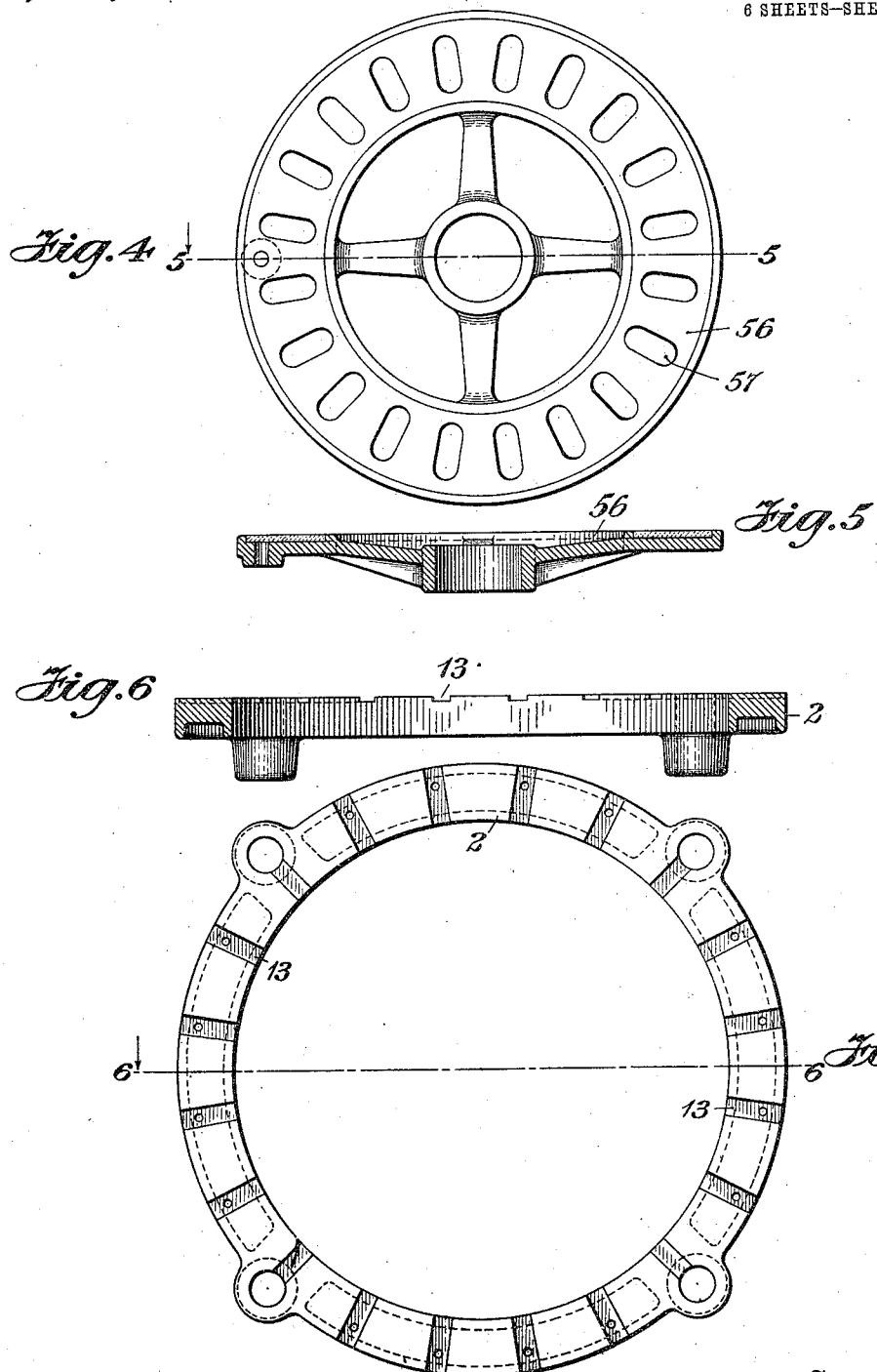

1,046,723.

Patented Dec. 10, 1912.

6 SHEETS—SHEET 5.

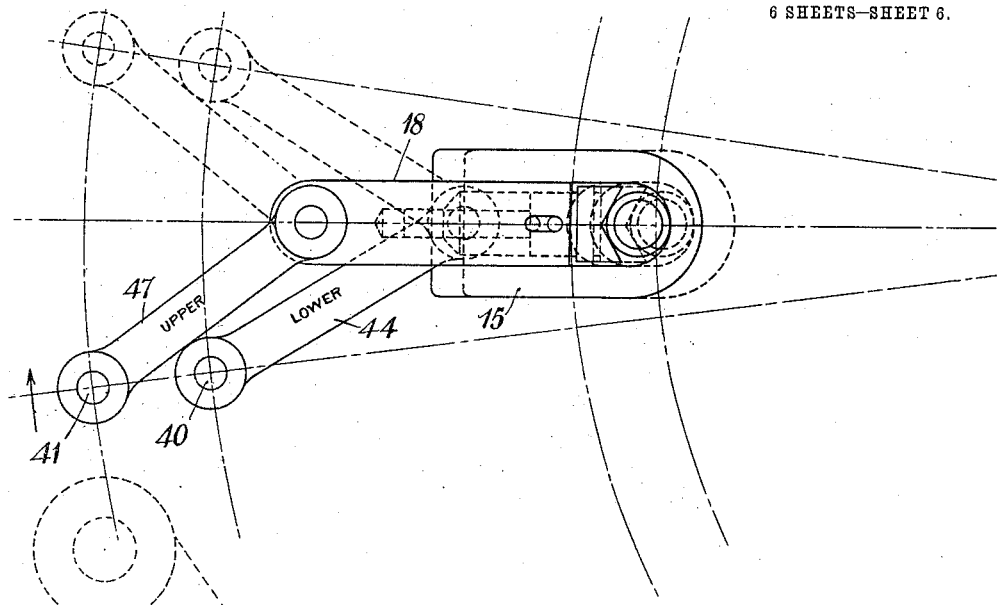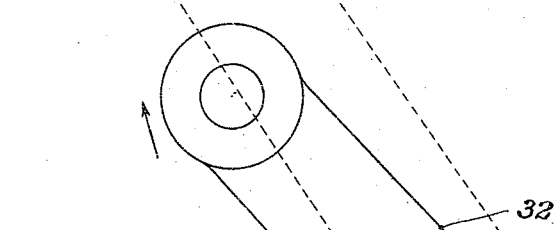

UNITED STATES PATENT OFFICE.

GEORGE W. BEADLE, OF EAST ORANGE, NEW JERSEY, ASSIGNOR TO WESTINGHOUSE LAMP COMPANY, A CORPORATION OF PENNSYLVANIA.

TUBE-CUTTING MACHINE.

1,046,723.  Specification of Letters Patent.  Patented Dec. 10, 1912.

Application filed November 22, 1909. Serial No. 529,334.

*To all whom it may concern:*

Be it known that I, GEORGE W. BEADLE, a citizen of the United States, and a resident of East Orange, in the county of Essex and State of New Jersey, have invented a new and useful Improvement in Tube-Cutting Machines, of which the following is a specification.

My invention relates to machines for severing glass tubing, and it has for its object to provide a machine of this character by means of which tubing may be expeditiously and accurately severed into any desired lengths.

In the manufacture of many articles and particularly of electric incandescent lamps, short pieces of glass tubing are employed in great quantities, and the cutting of long pieces of tubing into the short pieces has heretofore been effected by filing or otherwise scratching the tubing at the point of severance and then subjecting it to transverse strain. However, when tubing, and particularly the larger sized thereof, is severed in this manner, it usually does not break in a plane at right angles to its axis; and it often splinters and cracks in a longitudinal direction in addition to breaking very irregularly. Moreover, it is extremely difficult to obtain short pieces of tubing of uniform length.

According to the present invention, tubing may be severed into accurate and uniform lengths with the planes of severance substantially at right angles to the axis of the tubing, while splintering and all undesired cracking of the tubing are entirely avoided. Moreover, the severing of the tubing is effected expeditiously, and a large number of tubes may be severed at one time.

Figure 8:
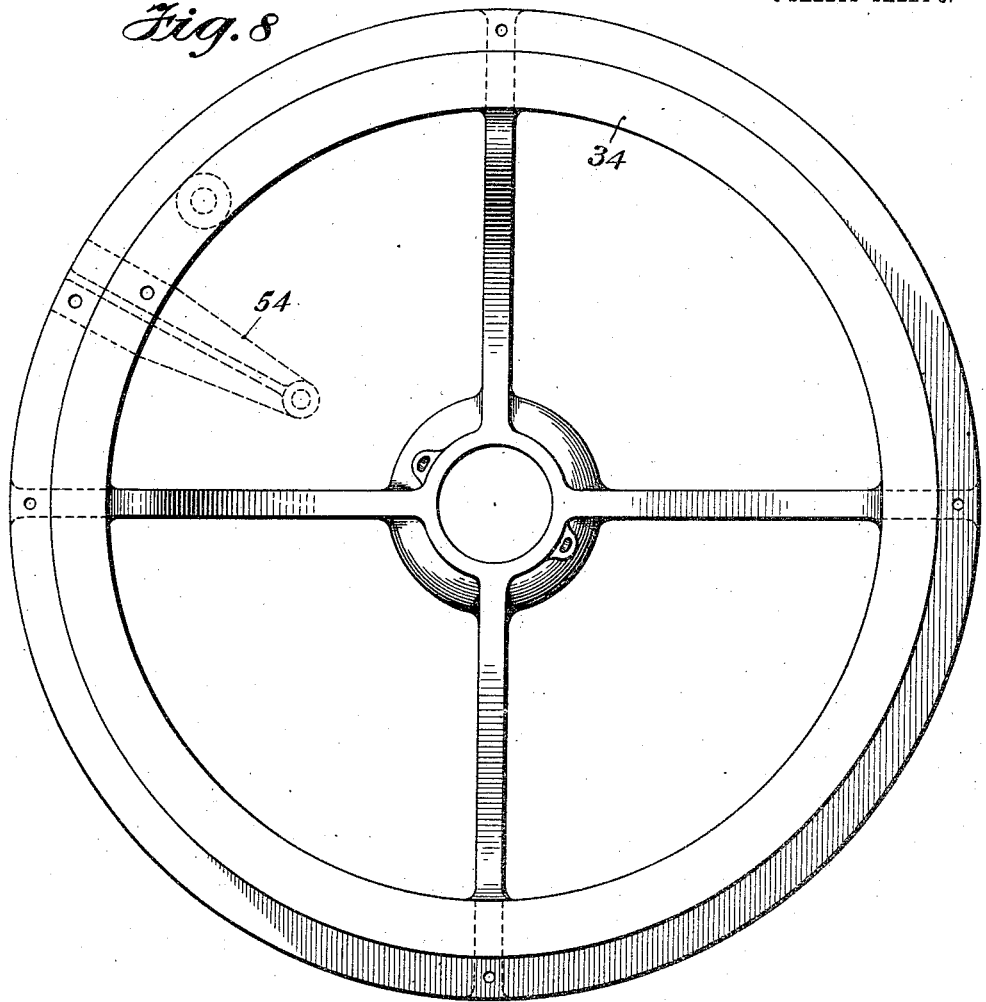
Figure 9:
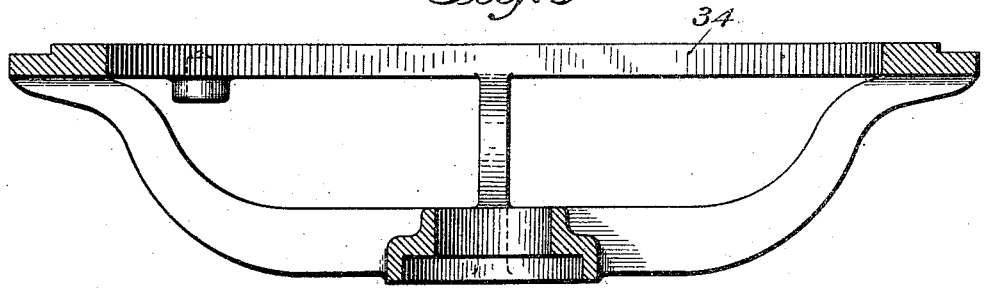

Figure 1 of the accompanying drawings is a plan view of a machine embodying, and for practising, the present invention, some of the parts being broken away and others being shown in section for the sake of clearness of illustration. Fig. 2 is a view in elevation and in vertical section of the machine shown in Fig. 1, the vertical section being along the line II—II of Fig. 1. Fig. 3 is a plan view of the main part of the frame or stationary member of the machine. Fig. 4 is a plan view and Fig. 5 is a vertical sectional view of a movable and adjustable stop of the machine. Fig. 6 is a vertical, sectional view, and Fig. 7 is a plan view of a stationary member that is supported by the frame of the machine. Fig. 8 is a plan view and Fig. 9 is a vertical, sectional view of a reciprocatory member of the machine. Fig. 10 is a side view. Fig. 11 is an end view and Fig. 12 is a plan view of a part of the reciprocating tube carrier of the machine. Fig. 13 is a plan and diagrammatic view of certain of the parts of the machine, showing their movements. Fig. 14 is a side view and Fig. 15 is a plan view of the clutch for retaining the tubes in the carrier, a portion of one of the parts being broken away in Fig. 14 for the sake of clearness of illustration.

The machine comprises a main frame member 1 and an auxiliary frame member 2 (Figs. 6 and 7) that is supported above the main frame member by means of posts 3. The main frame member 1 is provided with a bearing 4 for a driving shaft upon which are mounted idler and driving pulleys 5 and 6, respectively, and a bevel gear 7 that meshes with another bevel gear 8 upon the lower end of a vertical shaft 9. Lateral or guide bearings 10 are provided for the shaft 9 in the main frame member 1 and a step bearing 11 is provided therefor at the upper end of the shaft. Directly above the step bearing 11, and mounted upon the shaft 9, is an abrasion wheel 12, the sides of which are beveled near its periphery to provide a sharp edge. The wheel may be composed of any suitable material, but that which I have found most expedient to employ consists of finely divided carborundum mixed with a suitable binder. One of the especially desirable characteristics of the abrasion wheel is that it will create a large amount of heat when it is rapidly rotated and a glass tube is held in engagement therewith, the heat being a very useful element in cracking the glass.

The auxiliary frame member 2 is of annular shape, and is provided, upon its upper face, with radial recesses 13, which determine the positions of laterally slotted guide members 14 that are suitably secured to the auxiliary frame member. Operating between, and guided by, the guide members 14 are tube carriers 15 (Figs. 10, 11 and 12), having lateral projections 15ᵃ extending into lateral slots in the guide members 14, and vertically extending slots 15<sup>b</sup>, the inner ends of which are of V-shape.

Extending upwardly from the tube carriers are rods 16 that carry a set of inwardly extending slotted plates 17, the slots in which correspond to, and are directly above, the slots in the corresponding carriers, the said rods and the plates serving to support and steady the tubes as they are fed into the carriers 15. The carriers 15 are provided with horizontal apertures in which rods 18 (Figs. 14 and 15) are mounted for reciprocation, the inner ends of the rods being recessed for the reception of pistons 19 that are resiliently pressed outwardly by means of springs 20 and that carry, at their outer ends, V-shaped gripping members 22, between which and the V-shaped inner ends of the slots in the carriers the tubing to be severed is held.

Mounted upon the lower extremity of the vertical shaft 9 is a worm pinion 23, that meshes with a worm gear wheel 24 upon a shaft 25, located in bearings which are integral with the lower face of the main frame member 1, and upon the other end of which a worm pinion 27 is mounted. The worm pinion 27 meshes with a worm gear wheel 28, upon the lower end of a short vertical shaft 29, for which a bearing 30 is provided upon one side of the main frame member 1, and upon the upper end of which a crank 31 is mounted. The crank 31 is connected, by means of a link 32, to a wheel shaped reciprocating member 34 (Figs. 8 and 9) that is carried by the main frame member 1 upon a step bearing 35.

Secured directly upon the annular portion of the reciprocating member 34 is an annular member 36, having radial slots 37 in its upper face, corresponding to each of the tube carriers, in which radially adjustable members 38 and 39, respectively, are mounted and adapted to operate, the members 38 and 39 carrying pins 40 and 41, respectively, at their inner ends. Clamped between the members 34 and 36 is another annular member 43 having slots into which the pins 40 project, the said slots being inclined to the radii that intersect the same. The pins 40 are connected, by means of links 44, to the tube carriers 15, which links serve to impart the reciprocatory rotary motion of the members 34 to the radially movable tube carriers 15.

Mounted directly above the member 36 is another annular member or ring 45 that serves as a guide for still another annular member 46 having slots, into which the pins 41 project, that are inclined to the radii intersecting the same. The pins 41 are connected by means of links 47 to the rods 18, and serve to transmit the rotary reciprocating motion of the member 34, and of the other members carried thereby, to the rod 18. The pins 40 and 41 and the slots in the members 43 and 46 are at different distances from the axis of the shaft 9, which is the center of the machine, and the links 44 are longer than the links 47. The result of this is that the throw or travel of the rods 18 is greater than that of the tube carriers 15, and the movements of the clutches are more rapid than the movements of the tube carriers, particularly during the first portions of the movements of the said members inwardly. Thus, the clutches serve to grip the tubes firmly before they are pressed against the abrasion wheel.

The limits of travel of the tube carriers and of the clutch members may be regulated independently of one another by effecting circumferential adjustment of the members 43 and 46, such circumferential adjustment being effected by means of levers 50 and 51 that operate toothed segments 52 and 53, respectively, that mesh with toothed portions of the peripheries of the members 43 and 46. By reason of the inclination of the slots therein, circumferential adjustment of the members 43 and 46 effects radial adjustment of the positions of the pins 40 and 41, which determine the positions of the limits of travel, respectively, of the rod 18 and the tube carrier 15.

The member 34 is provided, upon one side, with an inwardly extending arm 54 that is connected at its inner end by means of a rod 55 to a wheel-shaped stop member 56 (Figs. 4 and 5) having radial slots 57 in its annular portion corresponding, respectively, to the slots in the tube carriers, the arm 54 serving to effect reciprocation of the stop member 56 simultaneously with the member 34. The stop member 56 is provided with a bearing upon the central portion on the main frame 1, and may be adjusted vertically thereof by means of a hand wheel 57 that is screw-threaded upon the central portion of the main frame member directly beneath the member 56, which slides freely on the rod 55 during such adjustment. The upper annular face of the member 56 is provided with a covering of suitable slightly resilient material, such as felt, for the purpose of providing a cushion for the ends of the tubes as they are dropped upon the same.

In the operation of the machine tubes of considerable lengths are fed downwardly through the vertical apertures in the plates 17 and in the carriers until their lower ends rest upon the stop member 56 between the radial slots therein, which are out of alinement with the slots in the carriers when the clutches are released, so as to permit of insertion of tubes in the carriers. The machine is started after it is fed with tubes, and the members 22 immediately grip and hold the tubes in the carriers, and then the carriers move the tubes inwardly toward and against the sharp edge of the abrasion wheel 12. At the same time, the stop member 56 is rotated until the slots therein are brought into alinement with the vertical slots in the carriers so that, after the tubes are severed, the severed pieces may drop through the slots in the member 56. As the tubes are pressed against the abrasion member, which revolves at a very high speed, notches are worn into them and considerable heat is produced by the abrasion, the heat traveling around the tubing in both directions from the ends of the notches until it meets and causes cracking of the tubing. The tubing becomes heated in a circumferential line extending through the notch much sooner and to a higher degree than in any other direction, with the result that the crack occurs in a plane substantially at right angles to the axis of the tube, and there is practically no tendency for lateral or other undesired cracking. Moreover, it is unnecessary to subject the tubing to lateral strain in order to complete the fracture. After the severance of the tubing, the carriers recede from the abrasion member, and the clutches are released to permit the tubes to drop again upon the stop member 56, which has been rotated, during receding of the carrier and release of the clutch, until the portions between the slots therein are brought into alinement with the slots in the carrier. The operation then continues as above set forth.

I claim as my invention:

1. The method of severing glass tubing which consists in abrading the same upon one side only at the point of severance until the heat produced by the abrasion travels around the tubing and causes it to crack.

2. The method of severing glass tubing which consists in abrading the same upon one side only at the point of severance at such a rate as to produce heat which travels around the tubing and causes it to crack.

3. A tube severing machine comprising a movable abrasion member, a reciprocatory member, a reciprocatory tube carrier actuated by the reciprocatory member toward and away from the abrasion member, a clutch for retaining the tubes in the carrier and also actuated by the reciprocatory member, and a stop actuated by the reciprocatory member and movable thereby into and out of alinement with the tube carrier.

4. A tube severing machine comprising a movable abrasion member, a reciprocatory member, a reciprocatory tube carrier actuated by the reciprocatory member toward and away from the abrasion member, a clutch for retaining the tubes in the carrier and also actuated by the reciprocatory member, a stop actuated by the reciprocatory member and movable thereby into and out of alinement with the tube carrier, and means for adjusting the travel of the tube carrier.

5. A tube severing machine comprising a movable abrasion member, a reciprocatory member, a reciprocatory tube carrier actuated by the reciprocatory member toward and away from the abrasion member, a clutch for retaining the tubes in the carrier and also actuated by the reciprocatory member, a stop actuated by the reciprocatory member and movable thereby into and out of alinement with the tube carrier, and means for adjusting the travel of the tube carrier and of the clutch, respectively.

6. A tube machine comprising a movable abrasion member, a reciprocatory member, a reciprocatory tube carrier actuated by the reciprocatory member toward and away from the abrasion member, a clutch for retaining the tubes in the carrier and also actuated by the reciprocatory member, a stop actuated by the reciprocatory member and movable thereby into and out of alinement with the tube carrier, and means for adjusting the distance of the stop from the abrasion member.

7. A tube severing machine comprising a movable abrasion member, a reciprocatory member, a reciprocatory tube carrier actuated by the reciprocatory member toward and away from the abrasion member, and a clutch for retaining tubes in the carrier and also actuated by the reciprocatory member.

8. A tube severing machine comprising a rotatable abrasion member, annular reciprocatory members having slots inclined to intersecting radii passing through them, radially adjustable members having pins extending respectively into the slots of the annular reciprocatory members, a reciprocatory tube carrier, a clutch for retaining the tubes in the carrier, and links connecting the tube carrier and the clutch, respectively, to the said pins.

9. A tube severing machine comprising a rotatable abrasion member, a reciprocatory member, annular members carried thereby having slots inclined to intersecting radii, adjustable members having pins projecting, respectively, into the slots in the annular members, means for adjusting the annular members with respect to the reciprocatory member, a reciprocatory tube carrier, a clutch for retaining tubes in the carrier, and links connecting the tube carrier and the clutch, respectively, to the said pins.

10. A tube severing machine comprising a rotatable abrasion member, reciprocatory annular members having slots inclined to intersecting radii, the slot in one of said annular members being at a greater distance from the center thereof than the slot in the other member, radially adjustable members having pins projecting respectively into the slots in the annular members, a reciprocatory tube carrier, a clutch for retaining tubes in the carrier, and links connecting the tube carrier and the clutch, respectively, to the said pins.

11. A tube severing machine comprising a rotatable abrasion member, reciprocatory and circumferentially adjustable annular members having slots at different distances from their centers which are inclined to intersecting radii, radially adjustable members having pins projecting, respectively, into the slots in the annular members, a reciprocatory tube carrier, a clutch for retaining tubes in the carrier, and links of different lengths for respectively connecting the tube carrier and the clutch to the said pins.

In testimony whereof, I have hereunto subscribed my name this 12th day of November, 1909.

GEORGE W. BEADLE.

Witnesses:
F. H. McSorley,
R. S. Karchner.

---

Copies of this patent may be obtained for five cents each, by addressing the "Commissioner of Patents, Washington, D. C."